United States Patent [19]
Kaneda

[11] Patent Number: 5,982,805
[45] Date of Patent: Nov. 9, 1999

[54] LASER GENERATING APPARATUS

[75] Inventor: Yushi Kaneda, Tokyo, Japan

[73] Assignee: Sony Corporation, Tokyo, Japan

[21] Appl. No.: 08/783,660

[22] Filed: Jan. 15, 1997

[30] Foreign Application Priority Data

Jan. 17, 1996 [JP] Japan .................................. 8-006033

[51] Int. Cl.[6] .................................................. H01S 3/08
[52] U.S. Cl. ............................................. 372/98; 372/99
[58] Field of Search ............................ 372/22, 99, 103, 372/98

[56] References Cited

U.S. PATENT DOCUMENTS

| | | | |
|---|---|---|---|
| 4,287,486 | 9/1981 | Javan | 372/103 |
| 5,124,999 | 6/1992 | Okazaki et al. | 372/22 |
| 5,243,611 | 9/1993 | Hyuga et al. | 372/22 |
| 5,388,113 | 2/1995 | Oka | 372/103 |
| 5,406,408 | 4/1995 | Ellingson et al. | 372/22 |
| 5,432,807 | 7/1995 | Okazaki et al. | 372/22 |

*Primary Examiner*—Rodney Bovernick
*Assistant Examiner*—Robert E. Wise

*Attorney, Agent, or Firm*—Hill & Simpson

[57] ABSTRACT

A laser light generating apparatus in which the laser light from a laser light source is intensified by an optical resonator arranged outside the laser light source and outputted after wavelength conversion by a non-linear optical crystal element arranged within the optical resonator. The laser light generating apparatus includes a laser light source for radiating the laser light, an optical resonator for resonating the laser light radiated from the laser light source, a non-linear optical crystal element having an anti-reflection film formed on its laser light incident surface and an aperture for interrupting the light reflected by the non-linear optical crystal element within the optical resonator. The non-linear optical crystal element is arranged in the optical resonator so that a line drawn normal to the laser light incident surface will be obliquely inclined relative to the optical axis of the laser optical resonated within the optical resonator. With the present laser light generating apparatus, the reflected light from the non-linear optical crystal element responsible for reverse traveling wave is interrupted by the aperture for suppressing generation of the reverse traveling wave in the light resonator, so that return optical to the laser light source is suppressed to eliminate the necessity for providing an optical isolator.

11 Claims, 5 Drawing Sheets

LASER GENERATING APPARATUS

BACKGROUND OF THE INVENTION

1. Field of the Invention

This invention relates to a laser light generating apparatus in which the laser light from a laser light source is intensified by a optical resonator located outside the laser light source and output after waveform conversion by a non-linear optical crystal element arranged within the optical resonator.

2. Description of the Related Art

As a high-efficiency laser light generating apparatus, there is proposed in e.g., U.S. Pat. No. 5,367,531 such a laser light generating apparatus in which the laser light from a laser light source is intensified by an optical resonator located outside the laser light source and output after wavelength conversion by a non-linear optical crystal element arranged within the light resonator.

With such laser light generating apparatus, it is necessary to control the wavelength of the laser light radiated from the laser light source and the length of an optical path within the light resonator to satisfy the conditions for resonation. It is therefore necessary for the output of the laser light radiated from the laser light source to be kept stable. In general, if there is any return light from the optical resonator to the laser light source, the laser light oscillation tends to be unstable. Thus it is crucial in the above-described laser light generating apparatus to suppress the return light from the light resonator to the laser light source.

Heretofore, an optical isolator is arranged between the laser light source and the light resonator for suppressing the return light to the laser light source by this optical isolator. However, this optical isolator is extremely expensive and prevents the cost reduction of laser light generating apparatus.

As a conventional laser light generating apparatus, such apparatus employing a so called ring type resonator is proposed for an optical resonator for preventing the above-described return light. With this ring type optical resonator, a light resonator 110 is constituted by four reflective mirrors 101, 102, 103 and 104, as shown in FIG. 1, for suppressing the return light to the laser an light source. With such optical resonator 110, the laser light in the laser light source is theoretically only the traveling wave proceeding in the light incident direction of the laser light from the laser light source L1, while the traveling wave proceeding in the opposite direction to the light incident direction of the laser light L2 is not generated such that no laser light is returned to the laser light source. The traveling waves L1 and L2 are referred to hereinafter as the forward traveling wave and the reverse traveling wave, respectively.

With the above-described laser light generating apparatus, it is generally presupposed that the laser light falls vertically on a non-linear optical crystal element used for wavelength conversion. With such a non-linear optical crystal element, an antireflection film is formed on the laser light incident surface for diminishing optical loss. The anti-reflection film should ideally eliminate the reflection completely. However, it is in fact extremely difficult to eliminate refection completely, such that reflection of on the order of 0.1 to 0.5% remains.

Therefore, if a non-linear optical crystal element 111 is arranged within the optical resonator 110 having the first to fourth reflective mirrors 101 to 104, as shown in FIG. 2, the forward traveling wave L1 is reflected by a laser light incident surface of the non-linear optical crystal element 111. The resonant frequency of the reflected light R1 by the non-linear optical crystal element 111 is equal to the resonant frequency of the forward traveling wave L1, due to the reversibility of light, unless a Faraday element or the like is present within the optical resonator 110. Therefore, if there is the slightest residual reflection, the reflected light R1 is in resonation with the forward traveling wave L1, thus generating a reverse traveling wave in the light resonator 110. That is, the reflected light R1 from the non-linear optical crystal element 111 traveling the closed light path in the light resonator 110 in a direction opposite to the forward traveling wave L1 for exciting the reverse traveling wave in the light resonator 110. The reverse traveling wave, thus generated in the inside of the light resonator 110, becomes a mode-matched return light R2 to the laser light source 112, thus making the laser light oscillation unstable.

In such a laser light generating apparatus, employing the ring-type light resonator, return light is produced by reflection from the non-linear optical crystal element, so that an optical isolator needs to be provided between the laser light source and the light resonator, thus making it difficult to lower the production cost.

For preventing reflection from the non-linear optical crystal element, it has also been proposed to cut the surface of the non-linear optical crystal element at a Brewster angle.

However, limitations are imposed on this method since the light handled in non-linear wavelength conversion is not necessarily the light less susceptible to reflection at the Brewster angle.

That is, if type 2 phase matching is used, the input light has different directions of light polarization. Therefore, if reflection of one of the polarized light beams can be prohibited by cutting the surface of the non-linear optical crystal element at the Brewster angle, typically not less than 20% of reflection loss is incurred for the other polarized light.

On the other hand, if the type 1 phase matching is used, the directions of light polarization of two input light beams are the same. Therefore, the reflection loss can be diminished by cutting the surface of the non-linear optical crystal element at the Brewster angle, insofar as these light beams are concerned. However, since the generated third light beam is generally in a direction of polarized light extending normal to the direction of the polarization of the input light, not less than 20% of the reflection loss is incurred insofar as this third light beam is concerned.

The method of cutting the surface of the non-linear optical crystal element at the Brewster angle is not practical since the reflection loss then is increased significantly.

Thus, in the laser light generating apparatus employing the non-linear optical crystal element, the method generally used is to form an anti-reflection film on the surface of the non-linear optical crystal element and to cause the forward traveling wave to be incident perpendicularly on this surface for realizing high efficiency wavelength conversion.

With the conventional laser light generating apparatus, as described above, an optical isolator for suppressing the return light from the optical resonator to the laser light source is indispensable, such that it has been difficult to lower the production cost of the apparatus.

SUMMARY OF THE INVENTION

It is therefore an object of the present invention to provide a laser generating apparatus in which generation of the reverse traveling wave, which returns light to the laser light source, is suppressed for eliminating the necessity of providing the optical isolator.

The present invention provides a laser light generating apparatus including a laser light source for radiating the laser light, an optical resonator for resonating the laser light radiated from the laser light source, a non-linear optical crystal element having an anti-reflection film formed on a laser light incident surface thereof, and an aperture for interrupting the light reflected by the non-linear optical crystal element within the optical resonator. The non-linear optical crystal element is arranged in the light resonator so that a line drawn normal to the laser light incident surface will be obliquely inclined relative to the optical axis of the laser light resonated within the optical resonator.

Preferably, the non-linear optical crystal element is tilted in a direction which minimizes the effect on the phase matching condition of the laser optical resonated within the light resonator so that the line drawn normal to the laser light incident surface is obliquely inclined with respect to the optical axis of the laser light resonated in the light resonator.

With an angle $\alpha$ between a line drawn normal to the laser incident surface of the non-linear optical crystal element and the optical axis of the laser optical resonated in the light resonator, an angle $\beta$ the effective diameter of the aperture subtends with respect to the non-linear optical crystal element and with a spreading angle $\delta$ of the light reflected by the laser incident surface, the equation the relation of $2\alpha \geq (\beta+\delta)$ preferably holds.

DESCRIPTION OF THE PREFERRED EMBODIMENTS

Figure 1:
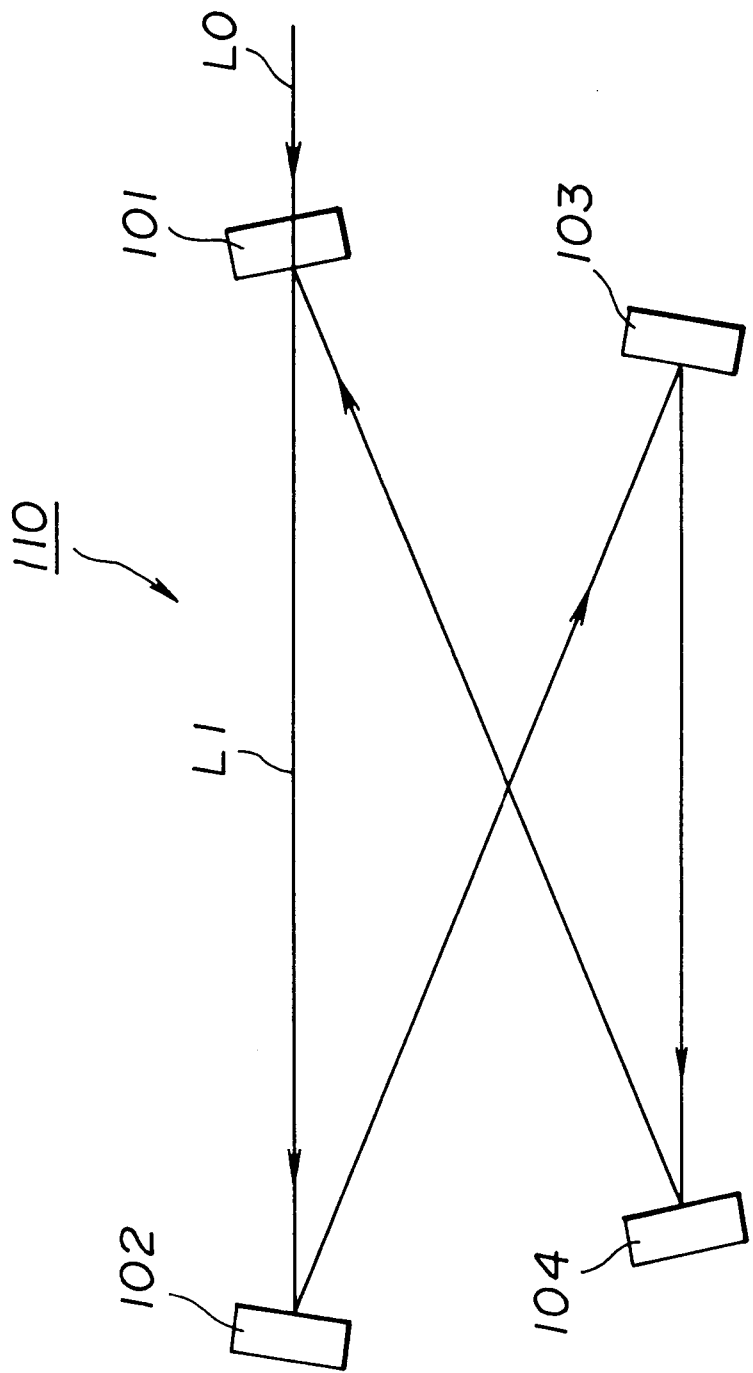
FIG. 1 is a schematic view showing an illustrative structure of a ring type optical resonator.
Figure 2:
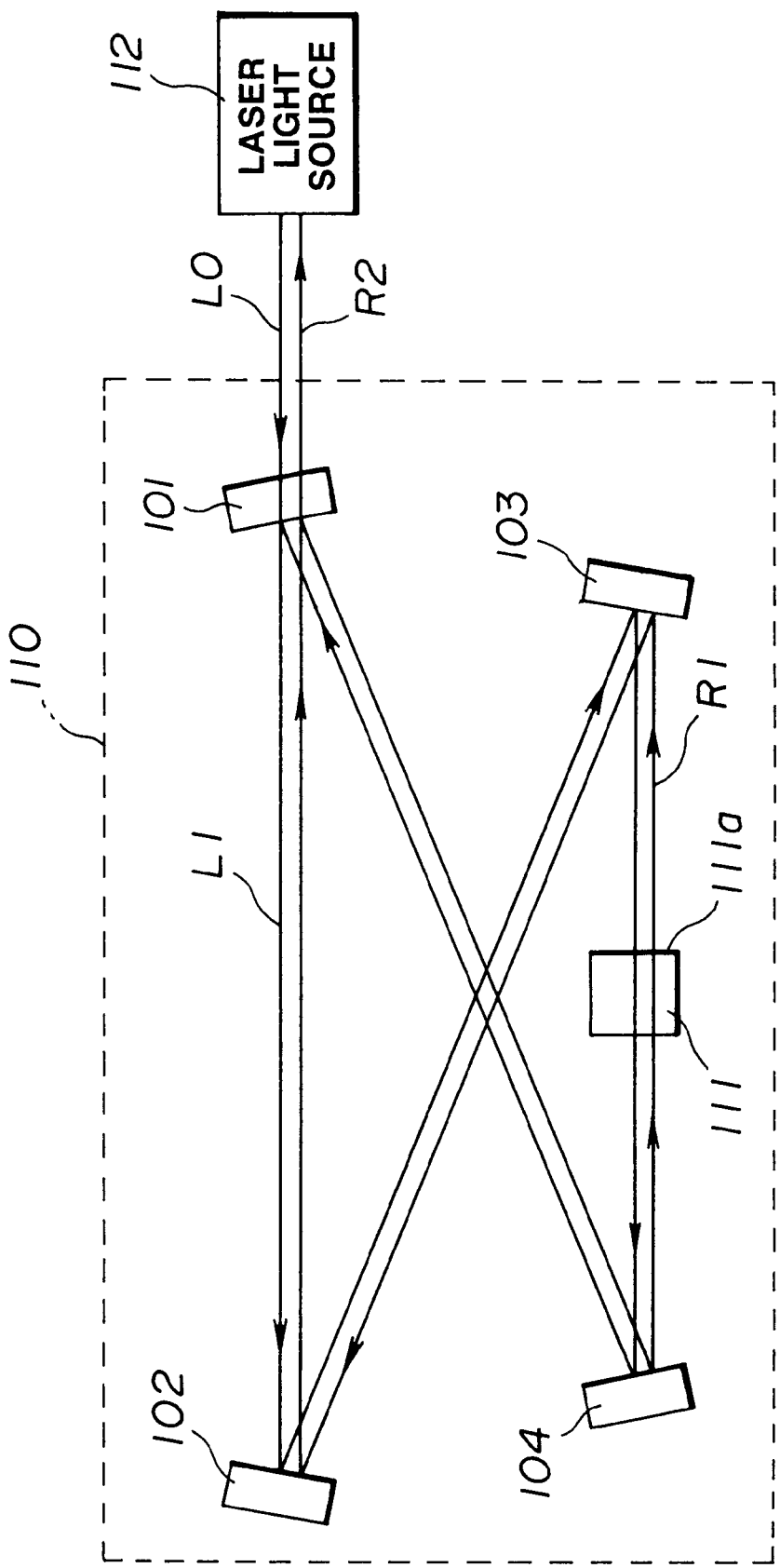
FIG. 2 is a schematic view showing an illustrative structure of a conventional laser generating apparatus.

Referring to the drawings, preferred embodiments of the present invention will be explained in detail. The present invention, however, is not limited to these merely illustrative embodiments.

Figure 3:
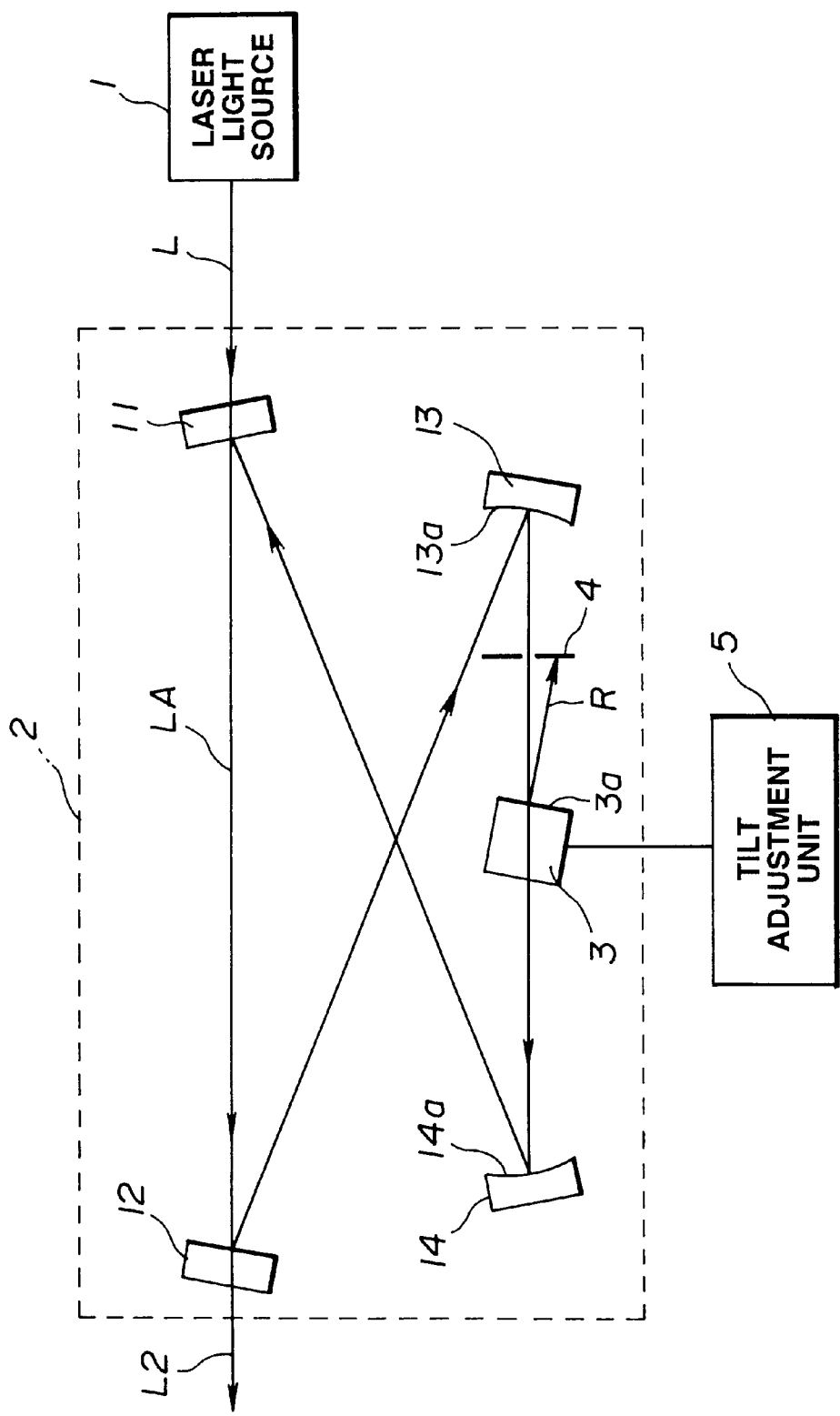
FIG. 3 is a schematic view showing an illustrative structure of a laser light generating apparatus according to the present invention.

The laser light generating apparatus of the present embodiment intensifies the laser light from the laser light source with an optical resonator provided outside of the laser light source, and wavelength-converts the laser light by a non-linear optical crystal element arranged in this optical resonator. The laser light generating apparatus includes a laser light source 1 for radiating laser light L, an optical resonator 2 for resonating the laser light L from the laser light source 1, a non-linear optical crystal element 3 arranged in the optical resonator 2 and an aperture 4 for interrupting the light reflected by the non-linear optical crystal element 3 in the optical resonator 2, as shown in FIG. 3.

The laser light generating apparatus also includes a tilt adjustment unit 5 for finely adjusting the tilt of the non-linear optical crystal element 3. The tilt adjustment unit 5 has a mechanism for finely adjusting the tilt in two directions of the non-linear optical crystal element 3 for finely adjusting the tilt of the non-linear optical crystal element 3 for shifting the reflected light R from the non-linear optical crystal element 3 as later explained and for finely adjusting the tilt of the non-linear optical crystal element 3 for satisfying the phase matching condition.

In the above-described laser light generating apparatus, the laser light source 1 radiates a laser light beam L of a preset wavelength which proves to be the fundamental wavelength laser light at the time of resonation in the optical resonator 2, and radiates laser light of a wavelength of 1064 nm by e.g., an Nd:YAG laser, which is a solid laser.

The light resonator 2, resonating the laser light L from the laser light source 1, is a so-called bow-tie type optical resonator, and includes a first reflective mirror 11 and a second reflective mirror 12, as plane mirrors, and a third reflective mirror 13 and a fourth reflective mirror 14 as concave mirrors.

The first reflective mirror 11, termed an input coupler, is a mirror transmitting the light at a certain ratio. It is through this first reflective mirror 11 that the laser light L from the laser light source 1 is incident on the light resonator L. On the other hand, the second to fourth reflective mirrors 12 to 14 are high reflectance reflective mirrors for achieving high efficiency.

The laser light L incident on the resonator 2 is sequentially reflected by the second reflective mirror 12, third reflective mirror 13, fourth reflective mirror 14 and the first reflective mirror 11 so as to be resonated in the resonator 2. This excites a forward traveling wave LA in the light resonator 2.

In the light resonator 2, the third reflective mirror 13 and the fourth reflective mirror 14 are concave mirrors and operate as focusing means for focusing the forward traveling wave LA resonated in the light resonator 2. Therefore, this light resonator 2 is a stable resonator having little loss and has an intrinsic resonator mode spatially defined by the curvature of a reflective surface 13a of the third reflective mirror 13 as a concave mirror, curvature of a reflective surface 14a of the third reflective mirror 14 as a concave mirror and the optical path length in the light resonator 2.

The non-linear optical crystal element 3, arranged within the optical resonator 2, is designed to perform non-linear wavelength conversion, and is arranged between the third reflective mirror 13 and the fourth reflective mirror 14 in the vicinity of a focal point for the intrinsic resonator mode. If the non-linear optical crystal element 3 is arranged in this manner in the vicinity of the focal point for the intrinsic resonator, the light density at the time of waveform conversion by the non-linear optical crystal element 3 is increased for realizing wavelength conversion with extremely high efficiency.

The wavelength-converted light is transmitted through the second reflective mirror 12 to be taken out of the light resonator 2 as output light L2.

On a laser light incident surface 3a of the non-linear optical crystal element 3 is formed an anti-reflection film for preventing the forward traveling wave LA from being reflected by the non-linear optical crystal element 3. However, since slight reflection occurs despite the anti-reflection film, part of the forward traveling wave LA is reflected by the laser light incident surface 3a. Thus, in the present embodiment, the non-linear optical crystal element 3 is arranged within the optical resonator 2 so that the laser light incident surface 3a is inclined relative to the optical axis of the forward traveling wave LA resonated within the optical resonator 2. This shifts the optical axis of the reflected light R from the optical axis of light transmitted through the non-linear optical crystal element 3, that is the forward traveling wave LA resonated within the optical resonator 2.

Figure 4:
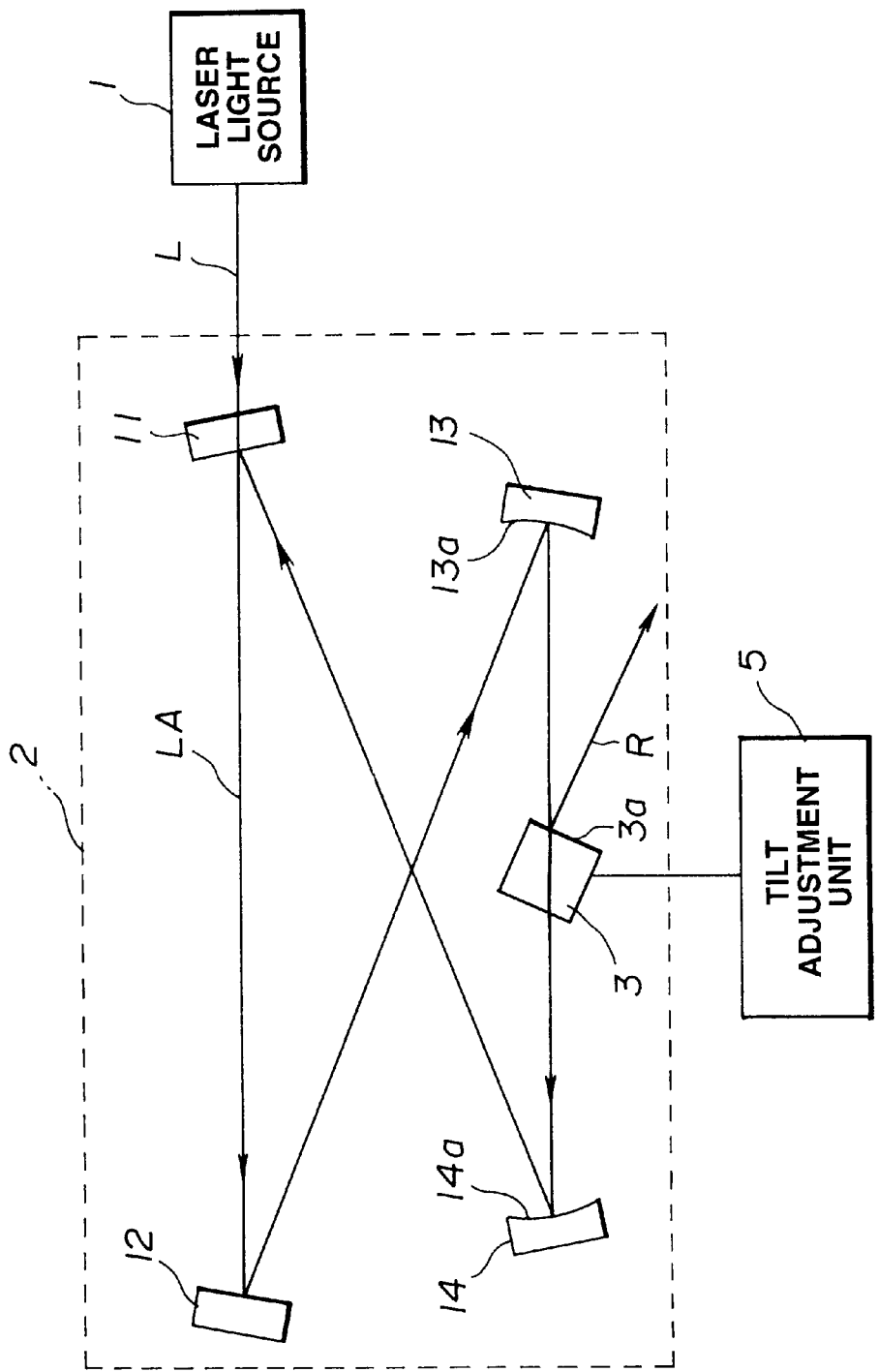
FIG. 4 is a schematic view showing the state in which the non-linear optical crystal element is tilted significantly.

Meanwhile, if, in the present laser light generating apparatus, the tilt of the non-linear optical crystal element 3 is sufficiently large, the reflected light R from the laser light incident surface 3a of the non-linear optical crystal element 3 emerges from the light resonator 2, as shown in FIG. 4, so that there is no risk of the reverse traveling light being excited by this reflected light.

However, if the tilt of the non-linear optical crystal element 3 is small, there is formed a closed path of the reflected light R from the non-linear optical crystal element 3 within the optical resonator 2. That is, the present light resonator 2 is a stable optical resonator employing concave mirrors as the third and fourth mirrors 13, 14 and moreover the non-linear optical crystal element 3 is disposed near the focal point of the intrinsic resonator mode, so that the reflected light R from the non-linear optical crystal element 3 is returned to substantially the same position despite slight tilt of the non-linear optical crystal element 3. Therefore, if the non-linear optical crystal element 3 is inclined only slightly, the reflected light R is resonated in the closed light path to excite the reverse traveling wave, even though the optical axis of the reflected light R is offset from that of the forward traveling wave LA.

Thus, in the present embodiment, the aperture 4 is arranged in the inside of the light resonator 2 for interrupting the light reflected by the non-linear optical crystal element 3, as shown in FIG. 3. This aperture 4 interrupts the light transmitted through the forward traveling wave LA and offset from the optical axis thereof, that is the reflected light R from the nonlinear optical crystal element 3, and is formed as a circular opening centered about the optical axis of the forward traveling wave LA. This aperture does not affect the forward traveling wave LA such that only the reflected light R is selectively interrupted to prevent excitation of the reverse traveling wave.

The present invention is not limited to the light resonator made up of four reflective mirrors as described above. That is, the light resonator's commonly used as such may be used within the scope of the present invention.

Meanwhile, with the above-described laser light generating apparatus, the operating efficiency is significantly changed with the position of the aperture 4. The position of the aperture 4 is now explained.

With the present laser light generating apparatus, the reverse traveling wave is prevented from being excited by interrupting the reflected light R by the aperture 4 for inhibiting formation of the closed light path of the reflected an light R within the optical resonator 2. However, with such optical resonator 2, which is a stable optical resonator employing the concave mirrors, the reflected light R from the approaches the optical axis of the forward traveling wave LA in the vicinity of the focal point of the intrinsic resonator mode, even if the non-linear optical crustal element 3 is tilted. Therefore, depending on the insertion position of the aperture 4, the light-interrupting portion by the aperture 4 approaches the optical axis of the forward traveling wave LA.

If the light-interrupting portion by the aperture 4 approaches the optical axis non-linear optical crystal element 3 of the forward traveling wave LA, part of the forward traveling wave LA to be reduced in light loss is also interrupted by the aperture 4, thus increasing the light loss. Specifically, the forward traveling wave is spread in the shape of a Gaussian distribution in a vertical direction relative to the optical axis in the intrinsic mode of the stable resonator having concave mirrors or lenses. If an aperture having a diameter equal to 1.5 times the spot size of the Gaussian beam, the light loss of approximately 1% is produced. It is therefore preferred that the aperture 4 be arranged at a position remote from the optical axis of the forward traveling wave LA.

Meanwhile, if, with the above-described light resonator 2, an angle between a line normal to the laser light incident surface 3a of the non-linear optical element 3 and the optical axis of the forward traveling wave LA resonated within the light resonator 2 is $\alpha$, the reflected light R from the laser light incident surface 3a is propagated with an angle equal to $2\alpha$ relative to the optical axis of the forward traveling wave LA and reaches the third reflective mirror 13 in this state. The third reflective mirror 13 operates as a focusing element having a recessed surface and condenses the light from near one of the focal points of the resonator 2 in the vicinity of the other of the focal points thereof. Thus the reflected light R is first reflected by the third reflective mirror 13 as a focusing element and again approaches the optical axis of the forward traveling wave LA. Thus the distance between the optical axes of the reflected light R and the forward traveling wave LA becomes maximum on the third reflective mirror 13 as the focusing element.

Thus, for minimizing the loss of the forward traveling wave LA and for effectively suppressing reverse traveling wave, it is preferred to arrange the aperture 4 in the vicinity of the third reflective mirror 13 operating as focusing means for focusing the laser light resonated in the optical resonator 2. Alternatively, the effective diameter of the third reflective mirror 13 operating as focusing means for focusing the laser light resonated in the optical resonator 2 may be defined so that the third reflective mirror 13 will operate as an aperture.

The above-described concept of the aperture arraying position can, of course, be applied to a wide variety of cases in which the optical resonator 2 is a stable resonator and the laser light incident surface 3a of the non-linear optical crystal element 3 is arranged in the vicinity of the intrinsic resonator mode.

The relation between the opening of the aperture 4 and the tilt of the non-linear optical crystal element 3 in the above-described laser light generating apparatus is hereinafter explained.

The forward traveling wave LA resonated in the light resonator 2 has a finite spatial spreading. Thus it is preferred for the opening of the aperture 4 to be larger than the spatial spreading of the forward traveling wave LA for decreasing the loss of the forward traveling wave LA.

On the other hand, for interrupting the reflected light R by inserting the aperture 4 within the light resonator 2, the radius of the opening of the aperture 4 needs to be less than the distance between the reflected light R and the forward traveling wave LA. On the other hand, since the reflected light R has a finite spatial spreading similar to that of the forward traveling wave LA, it is necessary for the aperture 4 to interrupt the light inclusive of the spreading of the reflected light R.

Figure 5:
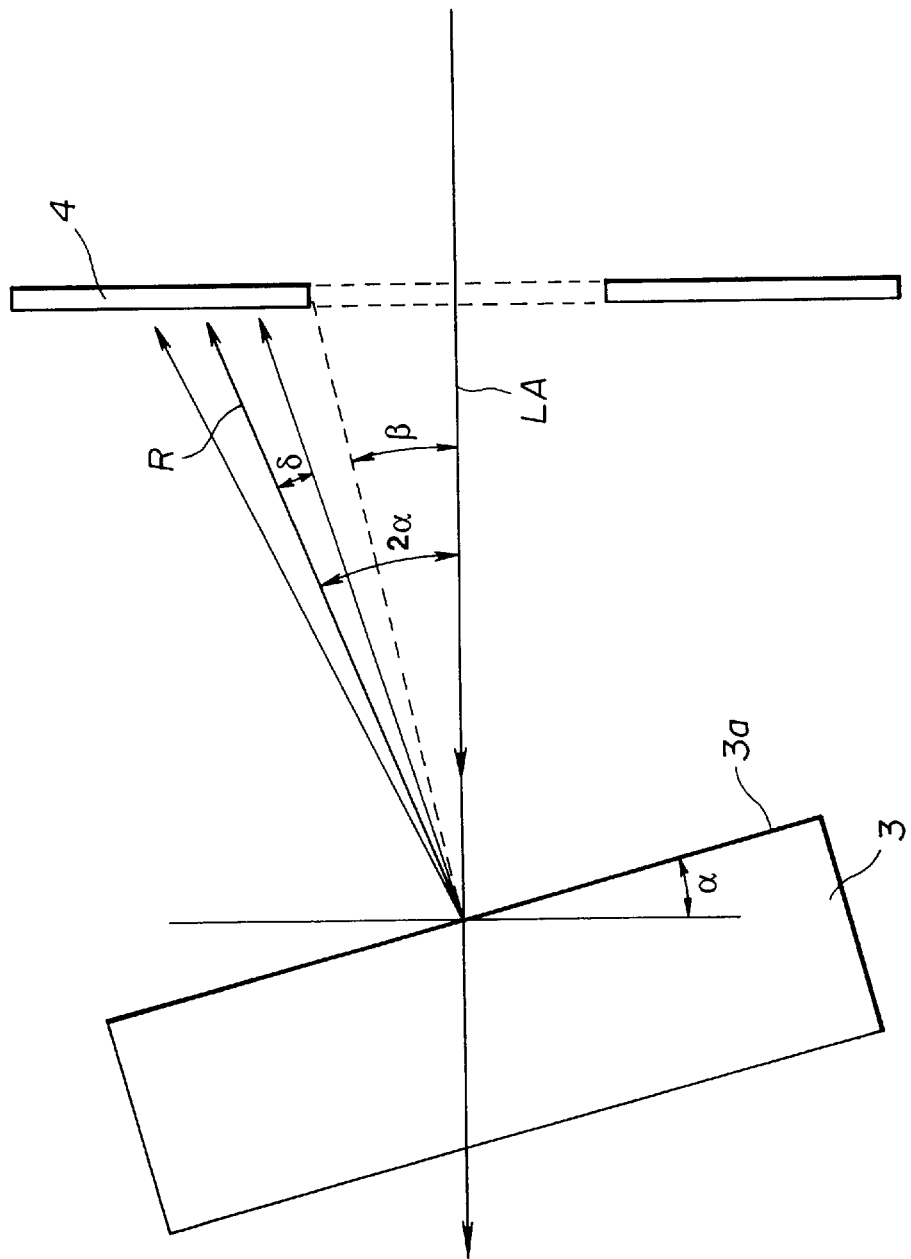
FIG. 5 is a schematic view showing the relation between the aperture opening and the tilt of the non-linear optical crystal element.

It is therefore preferred to set the opening of the aperture 4 and to tilt the non-linear optical crystal element 3 so that, if the tilt angle of the non-linear optical crystal element 3, that is the angle between the line normal to the laser light incident surface 3a of the non-linear optical element 3 and the optical axis of the forward traveling wave LA resonated within the light resonator 2, is α, an effective angle of the aperture 4, that is the angle subtended by the effective diameter of the aperture 4 as viewed from the laser light incident surface 3a, is β, and the spreading angle of the reflected light R from the laser light incident surface 3a is δ, as shown in FIG. 5, the relation of $2\alpha \geq (\beta+\delta)$ holds.

Meanwhile, the aperture 4 is not limited to optical components used in general as apertures, but practically any type of optical components, capable of interrupting the reflected light traveling in a direction offset from the forward traveling wave LA, can be used. That is, the aperture need not be a usual aperture having a circular opening, but may also be any appropriate structure disposed in the optical resonator for interrupting the reflected light from the laser light incident surface so as to be used as an aperture.

The direction of tilt of the non-linear optical element 3 in the above-described laser light generating apparatus is now explained.

The reverse traveling wave can be suppressed by tilting the non-linear optical element 3, as described above. However, since the phase matching for the non-linear optical crystal element 3 is done by exploiting the double refraction of the crystal, it is not necessarily possible to tilt the non-linear optical element 3 in an arbitrary direction. The tilt of the non-linear optical crystal element 3 is tantamount to changing the phase matching conditions. It is usually difficult to tilt the non-linear optical crystal element 3 with a larger angle. The tilt of the crystal with respect to the phase matching condition is extremely narrow depending on the material type. For example, if the ultraviolet light with a wavelength of 266 or 355 nm using a β barium borate crystal with a length on the order of 5 mm (BBO crystal), the allowance for this tilt is extremely narrow and is on the order of 0.01° depending on the crystal tilting angle.

However, in the case of a uniaxial crystal, such as BBO crystal, the phase matching condition is specified by the angle of offset from the Z-axis without dependency on the offset angle by rotation about the Z-axis. If the non-linear optical crystal element 3 is tilted so that the laser light incident surface 3a is inclined relative to the optical axis of the forward traveling wave LA resonated within the light resonator 2, it is preferred to tilt the non-linear optical crystal element in a direction which will diminish the effect on the phase matching conditions of the forward traveling wave LA resonated within the light resonator 2. For example, if the uniaxial crystal such as BBO crystal is used for the non-linear optical crystal element 3, the non-linear optical crystal element 3 is preferably inclined by rotation about the Z-axis so that the effect on the phase matching conditions for the forward traveling wave LA resonated within the light resonator 2 will be diminished.

The results of an experiment of actually generating the laser light using the above-described laser light generating apparatus are now explained.

The effective diameter of the third reflective mirror 13 was set to approximately 3.5 mm so that the third reflective mirror 13 will operate as an aperture approximately 3.5 mm in radius. As the non-linear optical crystal element 3, a BBO crystal having an anti-reflection film formed on its laser light incident surface 3a was used. This non-linear optical crystal element 3 was arranged so that the distance between the laser light incident surface 3a and the third reflective mirror 13 was approximately 25 mm. At this time, the effective diameter β of the aperture by the third reflective mirror 13 was 3.5 mm/25 or approximately 140 mrad or approximately 8°.

As the fundamental wavelength laser light from the laser light source 1, the laser light by an Nd:YAG laser with a wavelength of 1064 nm was used. At this time, the intrinsic resonator mode had a focal point spot size of approximately 31 μm, with the spreading angle δ being approximately 10 mrad or approximately 0.63°.

With the above-described laser light generating apparatus, the non-linear optical crystal element 3 was fixed so that its laser light incident surface 3a was approximately normal to the optical axis. The frequency of the laser light L from the laser light source was then changed in the neighborhood of the resonant frequency of the light resonator 2 for realizing laser frequency synchronization. The stray light from the light resonator 2 was detected by a photodetector for monitoring the light intensity within the light resonator 2. It was found that, while the intrinsic resonator mode starts to be established when the frequency of the laser light L coincides with the resonant frequency, the signal intensity starts simultaneously to be corrupted with noise. Although it was attempted to set the frequency control circuit to the state of a closed loop for synchronization with the resonation, laser oscillation itself was not stabilized such that stable synchronization could not be achieved.

Then, using the tilt adjustment unit 5, the non-linear optical crystal element 3 was tilted by rotation about the z-axis so as to diminish the effect on the phase matching condition. The noise was found to be diminished. The non-linear optical crystal element 3 was tilted until the angle of tilt of the element 3 was (8+0.63)/2=approximately 4.32 such that the reflected light appears to impinge on the outer side of the third reflective mirror 13, that is until the reflected light R was shielded substantially completely. This stabilized laser oscillation and frequency synchronization. At this time, the direction of tilt of the non-linear optical crystal element 3 was such a direction which had no effect on phase matching such that tilt of the non-linear optical crystal element 3 led to no significant changes in the wavelength conversion efficiency.

It was found from the above experimental results that tilting the non-linear optical crystal element 3 resulted in highly efficient prevention of the return light to the laser light source 1 and in highly stabilized laser oscillation. It was also found that, if the direction of tilting the non-linear optical crystal element 3 is such a direction as to minimize the effect on the phase matching conditions, the tilt of the non-linear optical crystal element 3 had substantially no effect on the waveform conversion efficiency.

What is claimed is:

1. A laser light generating apparatus comprising:
   a laser light source;
   an optical resonator for resonating the laser light from said laser light source;
   a non-linear optical crystal element having an anti-reflection film formed on a laser light incident surface thereof, said non-linear optical crystal element arranged in said light resonator so that a line drawn normal to said laser light incident surface will be inclined relative to the optical axis of the laser light resonated within said optical resonator; and
   an aperture for interrupting light reflected by said non-linear optical crystal element within said optical resonator.

2. The laser light generating apparatus as claimed in claim 1 wherein said non-linear optical crystal element is tilted in a direction which minimizes a negative effect on phase matching of the laser light resonated within said optical resonator so that the line drawn normal to said laser light incident surface will be obliquely inclined with respect to the optical axis of the laser light resonated in said light resonator.

3. The laser light generating apparatus as claimed in claim 1 wherein, with an angle α between a line drawn normal to the laser incident surface of the non-linear optical crystal element and the optical axis of the laser light resonated in said optical resonator, and angle β the effective diameter of said aperture subtends with respect to the non-linear optical crystal element and with a spreading angle δ of the light reflected by the laser incident surface, the equation $2\alpha \geq (\beta + \delta)$ is satisfied.

4. The laser light generating apparatus as claimed in claim 1 wherein said optical resonator is a resonator having a focusing means for focusing the laser light resonated within the optical resonator and wherein said focusing means forms said aperture.

5. The laser light generating apparatus as claimed in claim 1 wherein said light resonator is a resonator having a focusing means for focusing the laser light resonated within the optical resonator and wherein said aperture is arranged near said focusing means.

6. The laser light generating apparatus as claimed in claim 1 wherein said non-linear optical crystal element is a BBO.

7. The laser light generating apparatus as claimed in claim 1 further comprising a tilt adjustment means for finely adjusting a tilt of said non-linear optical crystal element.

8. The laser light generating apparatus as claimed in claim 7 wherein said tilt adjustment means includes a means for finely adjusting the tilt of said non-linear optical crystal element in two directions.

9. A laser light generating apparatus comprising:
a laser light source;
an optical resonator for resonating the laser light radiated from said laser light source;
a non-linear optical crystal element having an anti-reflection film formed on a laser light incident surface thereof, said non-linear optical crystal element being tilted in a direction which minimizes a negative effect on phase matching of the laser light resonated within said light resonator so that a line drawn normal to said laser light incident surface is obliquely inclined with respect to the optical axis of the laser light resonated in said light resonator; and a structure having an aperture in a light transmission path between said non-linear optical element and said laser light source, said aperture transmissive to select optical beam paths.

10. The laser light generating apparatus as claimed in claim 9 wherein said non-linear optical crystal element is a BBO.

11. A method of generating laser light comprising the steps of:
providing a laser light source;
resonating laser light radiated from said laser light source in a resonator;
providing a non-linear optical element having an anti-reflection film formed on a laser light incident surface thereof, said non-linear optical crystal element arranged in said optical resonator so that a line drawn normal to said laser light incident surface will be inclined relative to the optical axis of the laser light resonated within said optical resonator;
preventing at least a portion of reverse traveling wave with said anti-reflection film; providing a structure in a light transmission path between said non-linear optical element and said laser light source, said aperture transmissive to select optical beam paths; and
eliminating a remainder of the reverse traveling wave with said aperture.

* * * * *